United States Patent Office 2,777,886
Patented Jan. 15, 1957

2,777,886
PREPARATION OF PHENYL MAGNESIUM CHLORIDE

Hugh E. Ramsden, Metuchen, N. J., assignor to Metal & Thermit Corporation, New York, N. Y., a corporation of New Jersey No Drawing. Application May 12, 1954,
Serial No. 429,394

15 Claims. (Cl. 260—665)

The present invention relates to a process of preparing phenyl magnesium chloride.

Although phenyl magnesium bromide has heretofore been known and used as a Grignard reagent, its high cost has rendered its use non-attractive. Consequently, it was believed that phenyl magnesium chloride could be prepared more economically, thereby yielding a more desirable reagent. However, because of the extreme inertness of the aromatic chloride, the usual methods of preparing reagents in ether using chlorobenzene as a reactant were unsuccessful for the preparation of phenyl magnesium chloride. In the past resort was made to extreme conditions of high temperature and pressure for a period of hours, but even under these conditions, disappointing yields were obtained. Such processes were objectionable, not only because of the poor yields of the desired reagent, but also because of the formation of tars as by-products which are difficult to remove.

It is an object of the present invention, economically to prepare phenyl magnesium chloride in high yield and purity by reacting chlorobenzene with magnesium at reflux temperatures of about 130–135° C. and preferably 130–132° C., in the presence of copper sulfide which acts as a catalyst. It has been found that about 0.5–5% of the catalyst based on the weight of the magnesium is sufficient to effect catalysis of the reaction, 1%–2% being preferred.

The raw materials utilized in the present invention were standard commercial products. The magnesium utilized in the present invention did not necessarly possess a clean, unoxidized surface, but could be old and dirty. The magnesium may be in the form of turnings (resulting from milling the magnesium), granular material (produced on a hammer-mill), or in other comminuted forms. Similarly, the chlorobenzene was not a pure product but contained the usual impurities found in the commercial products. Since chlorobenzene is usually prepared from industrial coal tar benzene, it is expected that small amounts of chlorothiophene may be present in the commercial product. On analysis, the chlorobenzene used was found to contain 0.18% sulfur. Likewise, the catalyst used in the present invention was the ordinary untreated commercial product containing the usual impurities.

A feature of the present invention is the utilization of reflux temperatures of about 130–135° C. and preferably 130–132° C. at atmospheric pressure. This temperature range overcomes the disadvantage arising from the prior methods wherein super-atmospheric pressure and higher temperatures were employed. The violent reaction which could ensue as a result of such severe conditions results in charring and in the formation of tars, thereby contaminating the reaction product. With the present invention, the reaction between chlorobenzene and magnesium is easily controlled. The non-exothermicity of this reaction renders it necessary to apply heat in order to obtain a reaction. It is possibly by merely withdrawing the heat source to halt the reaction for a determined period of time after which further application of heat will permit the reaction to continue. As about ten to twenty hours is necessary in order to obtain complete reaction between the magnesium and chlorobenzene, the removal of the source of heat permits halting of the reaction when desired and its resumption at a future time.

Another embodiment of the present process resides in the advantageous use of a diluent or solvent during the reaction. It has been found that in the absence of a diluent, the reaction mixture becomes so viscous as to inhibit further reaction, thereby reducing the yield. It has also been found that charring occurs when no diluent is present during the reaction, thereby yielding an impure product. This solvent may be present at the beginning of the reaction or may be added to the reaction mixture at any time after initiation of the reaction but before it has become unduly viscous. In view of the variety of diluents useful herein, the last possible time for addition of the diluent must be determined separately for each material by simply observing the consistency of the mixture as the reaction progresses. Suitable solvents or diluents include chlorobenzene, benzene, toluene, xylene, phenyl ether, mixtures thereof and the like. If more than one mole of chlorobenzene per mole of magnesium is present in the reaction mixture, the excess chlorobenzene acts as a diluent and no other solvent need be added.

Another preferred embodiment of the present invention resides in carrying out the reaction under an inert atmosphere. Although this is not essential in the present process, the exclusion of air and its displacement by nitrogen, for instance, results in a shorter initiation period. Other inert gases include argon, neon, krypton and helium. By initiation period is meant the time from the beginning of reflux to the time the reaction actually commences. This period can generally vary over a wide range, for example from about twenty minutes to about five hours. However, when carrying out this reaction under nitrogen, an initiation period of only about twenty minutes to thirty-five minutes is observed. Another deleterious effect of the oxygen in the air on the reagent is the formation of phenols as a result of air oxidation. Thus, while a nitrogen atmosphere is not essential in the present process, it does provide additional advantages in the obtention of phenyl magnesium chloride in high yields and purity.

Still another embodiment of the invention resides in efficient agitation of the reaction mixture. It has been found that stirring is essential to the obtention of a high yield of a pure product. The absence of agitation may result in charring, a considerably longer initiation period and consequently a less economical process. The degree of agitation, namely, the speed of the stirrers, affects the rapidity of the reaction. More specifically, rapid agitation on the order of 10,000 R. P. M. causes the reaction to be complete three hours after reflux (130° C.), whereas slow stirrers, on the order of 100–200 R. P. M., may require 20 hours after reflux starts for completion. Furthermore, rapid agitation causes the reaction to commence before reflux temperatures of about 130° C. are reached, reaction being noted at 110° C.–118° C. Rapid agitation reduces the reaction period and is advantageous where rapidity of reaction is a desirable feature, but it is not essential in the present invention.

The phenyl magnesium chloride yields obtained by the process are about 92% based on the weight of magnesium as compared to prior processes wherein a maximum of only 50% by weight of the magnesium has been obtained. This process affords a considerable saving, thereby rendering the present process a commercially superior procedure for the manufacture of the phenyl magnesium chloride reagent. In addition, the catalytic initiation of the reaction between magnesium and chlorobenzene is brought about uniformly in twenty-five minutes instead of the usual lengthy period.

The following example is further illustrative of the present invention, and it will be understood that the invention is not limited thereto:

*Example*

One g. atom of magnesium turnings, one mole of commercial chlorobenzene, and 1% (by weight of the magnesium) of copper sulfide ($Cu_2S$) were charged into a one liter, 3-necked flask equipped with a stainless steel anchor stirrer, reflux condenser, a thermometer, and a Glas-col heater. All joints were glass. This mixture was stirred and heated to reflux. Twenty-five minutes after reflux began, a greenish color developed in the mix indicating that the reaction had started. Four additional moles of chlorobenzene were added 5 minutes after initiation of the reaction. Heating was continued for 19 hours and thirty-five minutes longer. The mixture was cooled, diluted with anhydrous ethyl ether and made up to one liter of solution in a volumetric flask by addition of more ether. The solution was shaken to disperse solids, allowed to settle for a moment, and a 20 ml. sample was pipetted into a 500 ml. Erlemeyer flask containing 50 ml. water and 50 ml. of 0.5 $H_2SO_4$. The whole mixture was heated on a steam bath for thirty minutes. 1.5 ml. of 0.04% bromocresol purple was used as an indicator for the back-titration with 0.2N NaOH solution and the yield was calculated. This is the well known Gilman titration, somewhat modified. The yield for this run was 92.5%.

While the invention has been described with reference to various examples and embodiments, it will be apparent to those skilled in the art that various modifications may be made, and equivalents substituted therefor, without departing from the principles and true nature of the present invention.

What is claimed by Letters Patent is:

1. A method of preparing phenyl magnesium chloride which comprises reacting chlorobenzene with magnesium at reflux temperatures in the presence of catalytic amount of copper sulfide, and recovering said phenyl magnesium chloride.

2. A method of preparing phenyl magnesium chloride which comprises reacting chlorobenzene with magnesium at reflux temperatures in the presence of a diluent and a catalytic amount of copper sulfide and recovering said phenyl magnesium chloride.

3. A method of preparing phenyl magnesium chloride which comprises mixing chlorobenzene, magnesium and copper sulfide, agitating and heating said mixture to reflux temperatures, maintaining said mixture at reflux temperatures by the application of heat until the reaction is complete, and recovering phenyl magnesium chloride.

4. A method of preparing phenyl magnesium chloride which comprises mixing equimolecular amounts of chlorobenzene and magnesium, and 0.5–5% of copper sulfide based on the weight of magnesium, agitating and heating said mixture to reflux temperature, adding a diluent after the reaction has started but prior to completion thereof, maintaining said mixture at reflux temperatures by the application of heat until the reaction is complete, and recovering phenyl magnesium chloride.

5. A method of preparing phenyl magnesium chloride which comprises mixing equimolecular amounts of chlorobenzene and magnesium, and 0.5–5% of copper sulfide based on the weight of magnesium, agitating and heating said mixture to reflux temperatures, adding additional chlorobenzene after the reaction has started but prior to completion thereof, maintaining said mixture at reflux temperatures by the application of heat until the reaction is complete, and recovering phenyl magnesium chloride.

6. A method of preparing phenyl magnesium chloride which comprises mixing chlorobenzene, magnesium, a diluent and copper sulfide, agitating and heating said mixture to reflux temperatures, maintaining said mixtures at reflux temperatures by the application of heat until the reaction is complete, and recovering phenyl magnesium chloride.

7. A method of preparing phenyl magnesium chloride which comprises reacting chlorobenzene with magnesium at reflux temperatures and in an atmosphere of nitrogen in the presence of copper sulfide and recovering said phenyl magnesium chloride.

8. A method of preparing phenyl magnesium chloride which comprises mixing chlorobenzene, magnesium and copper sulfide, agitating and heating said mixture to reflux temperatures of about 130–132° C. maintaining said mixture at reflux temperatures of about 130–132° C. by the application of heat until the reaction is complete, and recovering phenyl magnesium chloride.

9. A method of preparing phenyl magnesium chloride which comprises mixing chlorobenzene, magnesium and copper sulfide, agitating and heating said mixtures to reflux temperatures, maintaining said mixture at reflux temperatures by the application of heat until the reaction is complete, and recovering phenyl magnesium chloride.

10. A method of preparing phenyl magnesium chloride which comprises reacting chlorobenzene with magnesium at reflux temperatures in the presence of about 0.5–5% of copper sulfide based on the weight of magnesium and recovering high yields of phenyl magnesium chloride.

11. A method of preparing phenylmagnesium chloride Grignard reagent which comprises reacting chlorobenzene with magnesium at reflux temperatures in the presence of a catalytic amount of copper sulfide.

12. A method of preparing phenylmagnesium chloride Grignard reagent which comprises reacting chlorobenzene with magnesium at reflux temperatures in the presence of a diluent and a catalytic amount of copper sulfide.

13. A method of preparing phenylmagnesium chloride Grignard reagent which comprises mixing equimolecular amounts of chlorobenzene and magnesium and 0.5–5% of copper sulfide, agitating and heating such mixture to reflux temperature, adding a diluent after the reaction has started but prior to completion thereof, and maintaining said mixture at reflux temperatures by the application of heat until the reaction is complete.

14. A method of preparing phenylmagnesium chloride Grignard reagent which comprises mixing equimolecular amounts of chlorobenzene and magnesium and 0.5–5% of copper sulfide, agitating and heating said mixture to reflux temperatures, adding additional chlorobenzene after the reaction has started but prior to completion thereof, and maintaining said mixture at reflux temperatures by the application of heat until the reaction is complete.

15. A method of preparing phenylmagnesium chloride Grignard reagent which comprises mixing chlorobenzene, magnesium and copper sulfide, agitating and heating said mixture to reflux temperatures of about 130–132° C. and maintaining said mixture at reflux temperatures of about 130–132° C. by the application of heat until the reaction is complete.

References Cited in the file of this patent

UNITED STATES PATENTS

| Number | Name | Date |
|---|---|---|
| 2,056,822 | Britton et al. | Oct. 6, 1936 |
| 2,058,373 | Weissenborn | Oct. 20, 1936 |
| 2,462,391 | Hartough et al. | Feb. 22, 1944 |
| 2,468,510 | Owen | Apr. 26, 1949 |